United States Patent [19]

Schüssler et al.

[11] Patent Number: 4,856,494
[45] Date of Patent: Aug. 15, 1989

[54] SOLAR HEATING INSTALLATION WITH FAILURE-PROTECTED HEATING MEDIUM HOSE

[75] Inventors: Claus Schüssler, Königsbach-Stein; Janusz Wojcik, Pforzheim; Rolf Hemminger, Keltern-Dietlingen, all of Fed. Rep. of Germany

[73] Assignee: Witzenmann GmbH Metallschlauch-Fabrik Pforzheim, Pforzheim, Fed. Rep. of Germany

[21] Appl. No.: 131,590

[22] Filed: Dec. 11, 1987

[30] Foreign Application Priority Data

Dec. 17, 1986 [DE] Fed. Rep. of Germany ....... 3643038

[51] Int. Cl.$^4$ ................................................. F24J 2/38
[52] U.S. Cl. .................................... 126/424; 126/438; 138/103; 138/174
[58] Field of Search ............... 126/418, 424, 425, 438; 138/103, 172, 174, DIG. 8, 178, 153, 125, 126, 127, 134, 135, 136, 138, 177

[56] References Cited

U.S. PATENT DOCUMENTS

| | | | |
|---|---|---|---|
| 3,985,119 | 10/1976 | Oakes | 126/438 |
| 4,078,549 | 3/1978 | McKeen et al. | 126/425 X |
| 4,090,498 | 5/1978 | Benson | 126/425 |
| 4,404,961 | 9/1983 | Stuhlman | 126/424 X |
| 4,427,033 | 1/1984 | Ege | 138/103 |
| 4,484,568 | 11/1984 | Witt | 126/438 |
| 4,510,385 | 4/1985 | Welman | 126/425 X |
| 4,542,737 | 9/1985 | Wood | 126/425 |
| 4,602,613 | 7/1986 | Barr | 126/424 |

Primary Examiner—Margaret A. Focarino
Attorney, Agent, or Firm—Frishauf, Holtz, Goodman & Woodward

[57] ABSTRACT

To prevent snap-over of a flexible connecting tube conducting solar-heated liquid to a mirror which follows the travel of the sun through the sky and then changes to an inverted "night" position, as shown in FIG. 1 at (a), a flexible corrugated or pleated tube or hose (6) with a braid (9) to form a multi-layered structure (6,9) is surrounded by a stiffening jacket (10) in the form of a spiral metal tube with interlocking adjacent windings. The stiffening jacket has the characteristic to dampen movement of the tube and additionally the tendency to retain the tube in straight or at least single-bend position, so that unstable double bends (FIG. 1, B, C) are avoided. This substantially increases the lifetime of the tube. A lubricant (15) may be introduced between the corrugated tube (6) or the braid (9) and the stiffening jacket (10). Preferably, the braid is a wire mesh or braid (9) surrounding the corrugated tube (6). The end portions, adjacent attachments to ducts (2) on the mirror and a fixed attachment (4) can be reinforced.

21 Claims, 1 Drawing Sheet

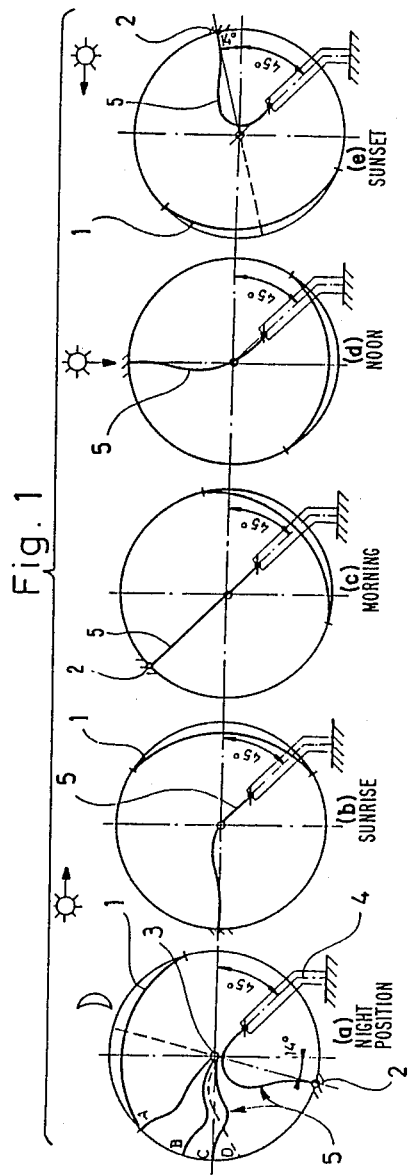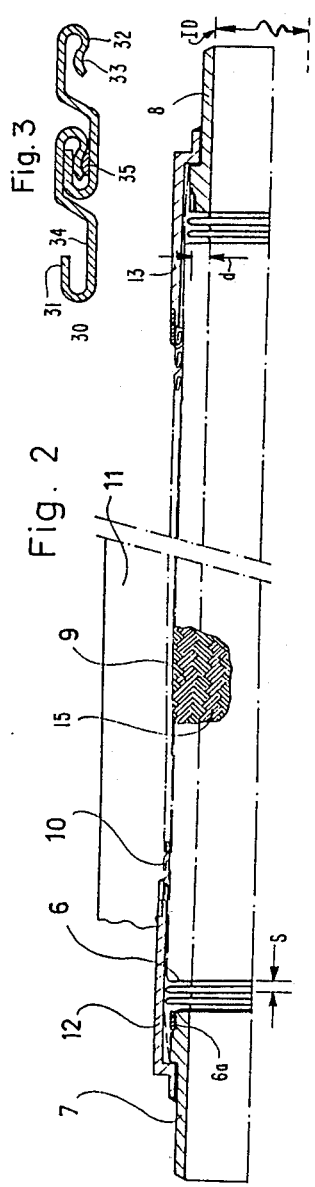

SOLAR HEATING INSTALLATION WITH FAILURE-PROTECTED HEATING MEDIUM HOSE

The present invention relates to solar heating installations, and more particularly to solar heating installations in which a mirror which is movable with the passage of the sun through the sky focusses the sun's energy on a heating zone, to which a medium to be heated is conducted by a flexible hose, and especially to such a hose construction which is protected against failure upon bending of the hose in various directions upon movement of the mirror as it follows the sun.

BACKGROUND.

Solar heating systems in which a mirror moves with the passage of the sun through the sky relative to the earth are well known. Such installations frequently not only move the mirror between a morning and evening position for the sun but, also, to a "night" position in which the mirror has its mirror surface facing downwardly, so that it is protected against contamination, for example by dust, rain, snow or the like. As the mirror moves when following the sun, it tilts about an angle of about 180°. For the night position, the mirror is placed in an upper dead center (UDC) position so that, considering the UDC position, the overall tilt angle of the mirror system will be about 250°.

The tilt angle of 250°, which must be followed by a flexible tube or hose, must be covered during 24 hours first in one direction and then, for return to the UDC position, in the other direction. A heat carrying medium, typically a fluid and especially a liquid medium, is circulated in the flexible tube. The flexible tube is coupled to a connecting flange or other fixed connecting position which usually is located outside of the angle of rotation of the mirror system. Entirely apart from the pure rotary movement, the flexible tube must also carry out a substantial swinging movement along a circular arc. The flexible hose is connected to the mirror system so that it must form a connection to the mirror as well as to the fixed connection for conducting the heated medium to a utilization position. It has been customary to use a metallic corrugated or accordeon-pleated flexible tube, surrounded by a mesh or woven material about which an insulating jacket is placed. The heat carrying medium is usually subjected to a pressure of about 20 bar, and may be subject to a temperature of between 300° to 400° C.

It has been found that, in operation, pleated or corrugated or similar flexible tubes have a lifetime which is substantially below that hoped for and expected. Most flexible tubes fail after 3000 and at best after 5000 cyles, by breakage of the tube. A suitable lifetime, however, is about 10,000 cycles.

THE INVENTION.

It is an object to provide a flexible tube or hose for use in a solar heating system which has an extended lifetime so that it can meet enhanced requirements for cyclical movement, while being simple and inexpensive to manufacture.

Briefly, the solar heating installation includes a dish-shaped mirror and a flexible tube or hose coupled to the mirror at a position other than its axis of rotation with one end, and to a fixed position at another end. The flexible tube or hose is a layer structure which has at least two layers, layers, and includes a mesh armor surrounding a corrugated tube. A stiffening jacket surrounds the tube or hose at least in the region of the bend of the tube or the hose as the mirror rotates; the stiffening jacket has the characteristic to dampen movement of the tube and has the tendency to retain the tube in a straight or at least single bend position.

The solution to the problem of failure was based on a detailed investigation of the behavior of the tube as the mirror moves; it was found that the tube is subject to sudden change of sign in bend, that is, by snapping over from a bend in one direction to a bend in another direction due to an intermediate unstable position; accordingly, and in accordance with the invention, the snap-over of the tube is substantially eliminated by including in the tube the straightening jacket which dampens movement of the tube and has the tendency to assist in maintaining the tube in straight or at least single-bend position.

DRAWINGS:

FIG. 1 illustrates, in a series of diagrams, the position of a mirror used in the solar system, and the shape of a heating medium conducting tube as the mirror moves between a night position, sunrise and sunset;

FIG. 2 is a partly cut away, half-axial section through the flexible tube; and

FIG. 3 is a detail sectional view, to an enlarged scale, of a suitable jacket for the tube.

ANALYSIS OF TUBE BENDING BEHAVIOR, WITH REFERENCE TO FIG. 1:

FIG. 1 is a highly schematic side view of a solar heating system, illustrating the system in six different operating positions, all drawn to the same scale and having the same geometric position in space.

A pivotable mirror 1 is retained in a suitable holding structure, as well known and, for example, of any customary design. A flexible tube 5 is coupled to a line 2, to supply a heat transfer medium. The duct or line 2 is coupled to a fixed connecting element 4 by the flexible tube 5, shown in FIG. 1 only as a single line. The mirror 1 rotates about an axis of rotation 3.

Diagram (a) of FIG. 1 shows the mirror 1 in the "night" position, in which the mirror 1 is approximately in the UDC position. Upon sunrise, the mirror is rotated to the position shown in diagram (b). The position of the sun is schematically indicated above the diagrams (b) to (e). The mirror then travels, corresponding to the position of the sun relative to the earth, in clockwise direction continuously until it reaches the sunset position shown, schematically, in diagram (e). After sunset, the mirror rotates in counterclockwise direction to again resume the night position of diagram (a).

The flexible tube or hose 5 bends in various ways as the mirror passes from the night position to the sunset position and back to the night position. A detailed investigation of the behavior of the tube 5 has shown that, as the mirror moves between the sunset position shown in diagram (e) and the night position shown in diagram (a), the tube is subjected to a sudden snap-over of the direction of its bend.

As seen in the drawings of FIG. 1, and referring to the diagram (e) at the sunset position, the tube 5 is bent sharply towards the right. The mirror, now, moves into the night position, see diagram (a), in counterclockwise direction. As the mirror moves backwardly, counterclockwise through the noon, morning and sunrise to the night position, it will first retain its bend towards the right, which bend, however, will become less and less. The bend of the tube, as the mirror moves, is shown by the respective lines labeled A, B, C, D in the diagram (a). The lesser bend of the mirror to the right is illustrated, for example, by the line A in diagram (a). As the mirror continues to move backwardly, for example towards the sunrise position (b), the bend towards the right increases slightly since the distance between the connecting point to the mirror at line 2 and the fixed connection point 4 becomes smaller. At the same time, however, and starting from the connection point 4, an increasing bend in the opposite direction will result so that, eventually, at the position shown in the full line C, two curved or bent regions follow each other, which are bulged in opposite directions; this may be referred to as positive and negative or righ-left bent deflections. This position is an unstable stress position for the tube 5. As the mirror rotates, the unstable position becomes stable in an opposite bend, as illustrated in the broken line D in diagram (a) of FIG. 1. This change from the position of the tube as shown in lines B and C, and especially line C, with the double, opposite bend, is sudden and, due to the instability of the tube in the position of the line C, is a snap-over change of bend, placing substantial stresses on the tube.

The detailed investigation, in accordance with the invention, has found that the sudden snap-over of the tube leads to localized overstressing, and this localized stress seems to be the reason for the failure of the corrugated tubes of the prior art. Mathematically speaking, this snap-over of the tube is an abrupt change of sign of the bend, under transient conditions, that is, without a smooth transition in bending.

Placing the stiffening jacket over the tube, in accordance with the present invention, which stiffening jacket has the characteristic of damping sudden movement, also inhibits the formation of substantial double bends, in opposite direction, as shown for example in the full-line position C of diagram (a) of FIG. 1. Thus, the jacket has the tendency to assist in maintaining the tube essentially straight or permitting only a bend of a comparatively great radius in one direction. The jacket, thus, has the effect that the tube moves into the stable position in one direction, shown for example by the broken line D of diagram (a) of FIG. 1, by changing over into the single bend already at a much smaller deflection in double-bent shape. Thus, change-over from one stable position, bent, for example, as shown in the diagram (e), to the other stable position, bend, for example, as shown in the full line E of the diagram (a), occurs much sooner, so that any sudden movement can be damped, to be less of a sudden snap-over movement and, additionally, being substantially less harmful because the double bend, in opposite direction, was of much lesser extent.

In accordance with a feature of the invention, the flexible tube or hose is a multi-layer tube which permits construction of a sturdy tube which is more elastic than a tube having similar pressure and temperature resistance properties and made only of a single layer.

The stiffening jacket can be located, as desired, for example between a corrugated or accordeon-pleated hose and an outer mesh or wire-braid cover. It has been found, however, in accordance with a feature of the invention, that the stiffening tube is preferably located at the outside of the composite inner tube, that is, outside of a mesh or braid or fabric covering. As is customary and as well known in tubes of this type, heat insulation material is then placed over the outside of the stiffening tube jacket to provide heat insulation for the heat conductive medium.

The stiffening tube, preferably, is a shaped spirally wound metal structure shown in detail in FIG. 3. It is constructed of a helically wound ribbon or tape 30 having bent-over ends 31, 32. One of the ends, preferably, is slightly corrugated as shown at 33. The engagement of the corrugated end 32, 33, with the flat portion 34 adjacent the first bend 31, permits insertion of a sealing bead 35, if desired. Conduits, tubes or hoses of this type, by and themselves, are well known. Simplified constructions, without the corrugation 33 and the sealing bead 35, are used for example, as flexible conduits for electrical cables, wires and the like to provide mechanical protection; they are also used as mechanically protective jackets or armors for rubber hoses placed therein. With the corrugation and the sealing bead, they can be used directly as flexible tubes or hoses capable of carrying fluids therein under pressure conditions which differ from atmospheric pressure.

It is a feature of the present invention that a structure known by itself and industrially readily available can be adapted to a solar heating system to substantially extend the lifetime of a flexible tube used therein and subjected to unusual operating conditions.

DETAILED DESCRIPTION OF CONSTRUCTION OF THE HOSE:

Referring now to FIG. 2, which is a half-longitudinal, part-sectional view, partly cut away:

The composite flexible tube has an inner metallic corrugated or pleated flexible hose 6. The flexible hose 6 is formed with circumferential undulations or waves. It is, continuously, at least double-walled and, preferably, has five wall sections, with an overall wall thickness of between 0.2 to 0.4 mm. Sequential wave peaks and valleys are connected by essentially radially extending flanks or sides. The spacing s of adjacent valleys, or peaks, respectively, is approximately 5.5 mm, and the depth d is about 25 mm for an inner diameter ID of the tube of about 10 to 15 cm. The spacing s between undulations can be increased towards the end portions of the corrugated tube 6 in order to provide for somewhat stiffer end zones, and to permit harmonious, smooth transition to a stiff connecting end nipple 7 and 8, respectively. The end nipples have inner cylindrical portions; the outer end structure of the nipples can be in accordance with any suitable shape, for further connection to pipe or duct elements, for example formed with flanges, threads, coupling elements and the like. In their simplest form, they continue as cylindrical end portions.

The corrugated tube 6 is connected to the end nipples 7 and 8 by an axially angled flange extension 6a which is fitted over a recessed sleeve portion of the nipple 7 and welded to the nipple 7. Only one such connection is shown in FIG. 2 for simplicity of illustration at the left side of FIG. 2.

A mesh or braid 9 of steel wire is pulled over the flexible tube 6. The mesh or braid 9 may be a single-layer mesh or a multi-layer mesh, for example a double-layer mesh. The ends of the braid or mesh 9 are secured to the nipples 7, 8, respectively, and prevent elongation of the tube 6 when pressurized fluid is introduced therein. They, thus, maintain the longitudinal dimension of the composite tube 5.

The composite tube 5 has, in accordance with a feature of the present invention, a stiffening jacket 10 located above the mesh or braid 9. The stiffening jacket 10, as such, is known, and has been used as protection for hoses or tubes, or as jackets or conduits before. In combination with the composite flexible tube 6, 9 of the present invention, however, applied to a solar system, the jacket 10 operates not merely as a protective jacket but, rather and essentially, as an assisting element to tend to straighten the flexible composite tube 6, 9 and prevent sudden movement if the bend or flex of the tube 6, 9 should be in an unstable bending position. Thus, the composite tube has a straightening and stretching assistance element applied thereto. It has been found, entirely unexpectedly, that the formation of opposite bends as shown at C in the diagram (a) of FIG. 1, is drastically reduced and, rather than the previously observed snap-over between the position of C and D of the diagram (a) of FIG. 1, a soft gradual transition of the flexible tube from the position shown in A and then B to the position of D can be obtained.

Preferably, and to further assist smooth movement, a lubricant 15 is introduced between the mesh or braid 9 and the jacket 10. The lubricant should have suitable high temperature resistance characteristics to accomodate the high temperature of the fluid when heated by solar radiation when the mirror is in the positions of the diagrams (b) to (e). If the jacket 10 is placed directly over the tube 6, the lubricant 15 can be placed directly over the tube 6.

To complete the system, and to prevent heat loss from the fluid medium circulating within the tube 6, an insulation 11, of any standard and suitable construction is used, and, since it is well known as such, is shown only schematically in FIG. 2.

The termination and maintenance of position of the tube 6 adjacent the end points can be carried out in various ways. FIG. 2 illustrates one arrangement, in which bending protective sleeves 12 and 13 are secured to the respective nipples 7, 8. These sleeves 12 and 13 extend somewhat beyond the end portions of the tube 6. This prevents sharp bends at the connections. The sleeves 12, 13 preferably do not terminate in flat ends but, rather, are either slightly flared or rounded at their end portions, and either butt against or slightly overlap the jacket 10. They can be secured to the jacket 10 and, simultaneously, form an attachment point for the jacket 10, for example by welding, soldering, or any other suitable connection.

The end regions of the tube 6 can be stiffened by changing the undulation or wave or corrugation profile of the tube 6, for example by increasing the spacing s of the undulations, and/or decreasing the depth d of the undulations. This can be done separately or independently of the sleeves 12, 13 and may extend towards the bending portions of the tube 6 beyond the sleeves 12, 13. Welding the sleeves 12, 13 to the jacket, and even providing the sleeves, are not necessary features.

The high lifetime of the tube 6 is obtained, in accordance with a feature of the invention, by specifically dimensioning the corrugations to provide for flexibility together with requisite stiffness and strength. Thus, in the region where the tube 5 is subjected to bending in opposite direction, the depth d of the undulations should be greater than 15%, preferably even greater than 18%, for example about 20 or 22%, of the inner diameter ID; the spacing s between the crests of undulations, should be less than about 15%, preferably less than 12%, for example about 10% of the inner diameter ID of the tube 6.

The end portions of the flexible tube 6 preferably should be stiffened so that strains, and consequent stressing of the corrugated tube 6, are separated from the fixed connection with the nipples 7, 8. This is of importance since the ends of the corrugated tube 6, due to their connection with the nipples 7, 8, are always subjected to extra stressing due, for example, to the weld or any other suitable connection with the end nipples, with flanges, or the like. Thus, the end portions of the flexible tube can be stiffened by changing the profile of the corrugations, for example by increasing the spacing of the corrugations or by forming the corrugations with a lesser depth d.

The high temperature lubricant 15 is introduced between the jacket 10 and the corrugated tube 6, preferably between the tube 10 and the braid or mesh 9. Lubricant 15 enhances early transition of the bend of the tube from the unstable region, as shown by the lines B and C in position (a) of FIG. 1, into a stable position, as shown for example by the broken line D and line E.

Various changes and modifications may be made within the scope of the inventive concept. For example, other arrangements to increase the stiffness of the flexible tube 6 adjacent the end portions can be employed such as increasing the number of layers of the tube 6 adjacent the end portions thereof.

I claim:

1. The combination of a solar heat installation dish mirror (1)
   movable between a night position and a sequence of a plurality of day positions, in which the mirror follows the passage of the sun relative to the earth for concentration of sun energy,
   with
   a flexible tube or hose (5) adapted to have a medium to be heated by solar energy passed therethrough,
   one end of said flexible tube or hose (5) moving with the mirror and another end of the flexible tube or hose being secured to a fixed attachment element (4),
   said flexible tube or hose (5) being bent and deformed into at least part-undulating multi-bend shape during movement of the mirror between the night position and a terminal day position,
   the bend of the tube or hose (5) changing sign or direction as the mirror moves between said night and said terminal positions,
   wherein said flexible tube or hose (5) includes a mesh or braid armor (9) and heat insulating material (11); and
   wherein, in accordance with the invention,
   the flexible tube or hose (5) comprises a layered flexible tube structure having at least two layers (6, 9),
   one (9) of said layers being formed by the mesh armor (9) and another one (6) of said layers comprising a flexible tube structure (6); and
   a stiffening jacket (10) is provided, surrounding one of the layers of the tube or hose (5) at least in the region of the bend of the tube or hose,
   said stiffening jacket (10) having the characteristics to dampen said movement of the tube and to have the tendency to retain the tube in positions which includes at least one of:
   straight position, and
   single bend position,
   to form a motion restrained composite tube.

2. The combination of claim 1, wherein said mesh armor (9) is placed against the outer circumference of the flexible tube structure (6), the stiffening jacket (9) is located outside of said mesh armor (9), and the heat insulating material (11) surrounds the outside of said stiffening jacket.

3. The combination of claim 1, wherein the stiffening jacket (10) comprises a strip or tape spirally wound to form a hose or conduit, said strip or tape, in cross section, being formed with interlocking end portions which, upon spiral winding, engage into each other.

4. The combination of claim 3, wherein the spiral strip or tape comprises a metal strip.

5. The combination of claim 1, wherein the flexible tube structure (6) comprises a corrugated or pleated tube having, at least in the region subject to bending, a pleat depth of at least 15% of the internal diameter (ID) of the flexible tube structure (6).

6. The combination of claim 5, wherein the pleat depth is at least 18% of the internal diameter.

7. The combination of claim 1, wherein the flexible tube structure (6) is a corrugated or pleated tube, and wherein the spacing (s) between adjacent crests of the pleated tube, at least in the region of the bend, is less than 15% of the internal diameter (ID) of the tube.

8. The combination of claim 7, wherein the spacing (s) is less than 12% of the internal diameter (ID).

9. The combination of claim 7, wherein, at least in the region of the bend of the tube, the corrugation depth is at least 15% of said internal diameter (ID).

10. The combination of claim 8, wherein, at least in the region of the bend of the tube, the corrugation depth is at least 18% of said internal diameter (ID).

11. The combination of claim 1, further including a stiffening arrangement formed at the ends of the flexible tube structure (6) adjacent its connection to the mirror and said fixed means (4), respectively.

12. The combination of claim 11, wherein said flexible tube structure (6) comprises a corrugated or pleated tube;

and wherein said stiffening arrangement comprises a corrugation or pleating profile changing the stiffness of said flexible tube or hose in the direction towards increased stiffness at the end portion with respect to a central portion thereof by at least one of: increase of spacing (s) between crests of the undulations or pleats and decrease of depth (d) between the crests of the undulations or pleats.

13. The combination of claim 11, wherein said stiffening arrangement comprises protective sleeves (12, 13) surrounding the end portions of the composite flexible tube.

14. The combination of claim 13, wherein said protective sleeves are stiff sleeve elements (12, 13).

15. The combination of claim 13, wherein said stiffening jacket (10) is a metal jacket; said stiffening sleeves comprise metal elements, and said stiffening jacket (10) and said sleeves are joined axially and welded at their axial junctions.

16. The combination of claim 11, wherein said flexible tube structure (6) comprises a pleated or corrugated tube or hose (6); and wherein said stiffening arrangement comprises additional layers of pleated tube or hose material.

17. The combination of claim 1, further including a high temperature lubricant (15) located between the layered structure (6), 9 and the stiffening jacket (10).

18. The combination of claim 1, wherein said stiffening jacket (9) has the additional characteristic of a limited bending radius, and wherein said stiffening jacket defines the smallest possible bending radius of the flexible tube or hose.

19. The combination of claim 1, wherein said flexible tube structure (6) is a corrugated pleated tube or hose formed as a multiple-layer pleated metal structure.

20. The combination of claim 2, wherein said flexible tube structure (6) is a corrugated pleated tube or hose formed as a multiple-layer pleated metal structure.

21. The combination of claim 4, wherein the metal strip comprises a steel strip.

* * * * *